July 15, 1969     D. SCARAMUCCI     3,455,534
VALVE AND TWO-PIECE SEAT ASSEMBLY
Filed May 6, 1968     2 Sheets-Sheet 1
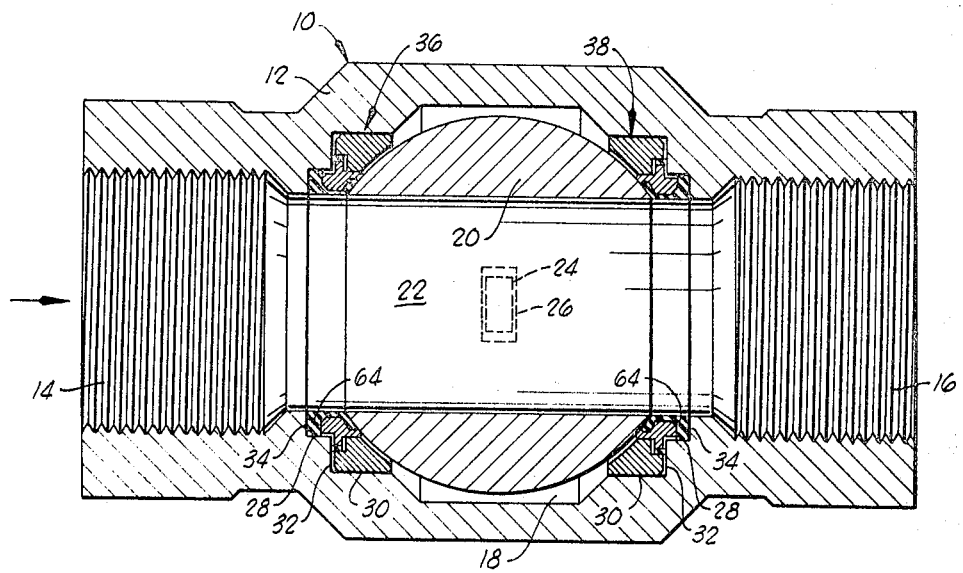
Fig. 1
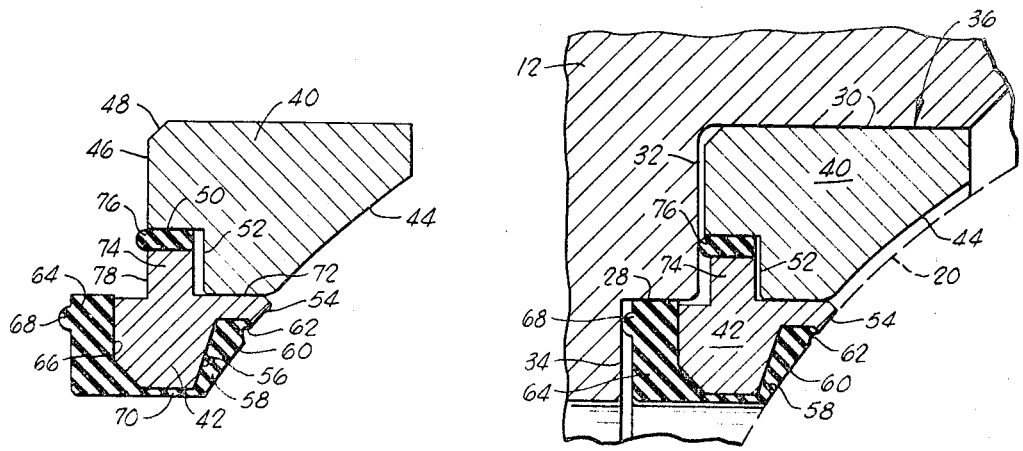
Fig. 2
Fig. 3
INVENTOR.
DOMER SCARAMUCCI
BY
Dunlap, Laney & Hessin
ATTORNEYS

INVENTOR.
DOMER SCARAMUCCI
BY
ATTORNEYS

United States Patent Office 3,455,534
Patented July 15, 1969

3,455,534
VALVE AND TWO-PIECE SEAT ASSEMBLY
Domer Scaramucci, Oklahoma City, Okla., assignor to Balon Corporation, Oklahoma City, Okla., a corporation of Oklahoma
Filed May 6, 1968, Ser. No. 726,669
Int. Cl. F16k 5/06
U.S. Cl. 251—175          28 Claims

ABSTRACT OF THE DISCLOSURE

A two-piece seat assembly for a valve having a "floating" valve member wherein the assembly has an outer, relatively rigid ring forming a bearing for the valve member at the downstream end of the valve, and an inner ring with sealing material on the valve-member end thereof to seal against the valve member at either the upstream or the downstream end of the valve. An elastomer is provided on the outer end of the inner ring and is sized to be retained under compression at all times to urge the inner ring against the valve member and provide a seal in all operating positions of the valve member at both the upstream and downstream ends of the valve.

BACKGROUND OF THE INVENTION

Field of the invention

This invention relates to improvements in valves, and more particularly, but not by way of limitation, to an improved seat assembly for a valve.

Description of the prior art

One of the time-honored problems in the design of valves is to provide seals which are effective under both high pressure and low pressure conditions and which will not be damaged through operation of the valve, other than ordinary wear. The softer elastomers provide the most effective low pressure seals but are difficult to contain in operating position under high pressure conditions, particularly without damage thereto during opening or closing of the valve. When a valve having a floating valve member is used under high pressure conditions, the downstream seat is sometimes subjected to excessive forces which damage the elastomer seals, unless the valve member is effectively supported by a bearing structure, and this has been difficult to do in an economical manner.

Summary of the invention

In one aspect, the present invention contemplates a seat assembly for a valve having a floating valve member, with the seat assembly comprising outer and inner rings. The outer ring is formed of a relatively inflexible material and is shaped to mate with the valve member to form a bearing for the valve member when the assembly is used at the downstream end of a valve. The inner ring slides in the outer ring and has more elastic or flexible material on the opposite ends thereof to sealingly engage the valve member and the valve body to efficiently seal around the respective end of the valve in which the assembly is used. The inner ring moves upstream and downstream with the valve member as the valve member is opened and closed to provide an effective seal against the respective side of the valve member in all operating positions of the valve member.

An object of this invention is to provide a seat assembly particularly useful in a valve having a floating valve member and which will function as either an upstream or a downstream seal.

Another object of this invention is to provide a valve seat assembly which is effective in both high pressure and low pressure service conditions.

A further object of this invention is to provide a downstream seat assembly for a valve having a floating valve member and which will efficiently support the valve member and prevent damage to the sealing material employed in the seat assembly.

Another object of this invention is to provide a valve having efficient seat assemblies and wherein the machining required in the valve is maintained at a minimum.

A still further object of this invention is to provide a valve and seat assembly which may be economically constructed and which will have a long service life.

Other objects and advantages of the invention will be evident from the following detailed description when read in conjunction with the accompanying drawings which illustrate the invention.

Brief description of the drawings

FIG. 1 is a sectional view through a valve looking up toward the valve stem.

FIG. 2 is an enlarged typical cross-sectional view through a seat assembly used in the valve of FIG. 1.

FIG. 3 is a view similar to FIG. 2 illustrating the operation of the seat assembly at the upstream end of a valve.

Description of the preferred embodiments

Figure 4:
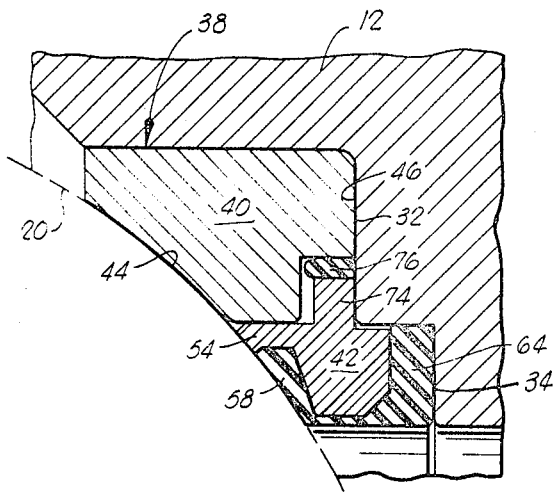
FIG. 4 is a view similar to FIG. 3, but illustrating the operation of the seat assembly at the downstream end of a valve.

Referring to the drawings in detail, and particularly FIG. 1, reference character 10 generally designates a complete valve which includes a body or housing 12 having an inlet 14 and an outlet 16 communicating with the opposite ends of a valve chamber 18. It will be readily understood by those skilled in the art that the inlet 14 and outlet 16 may be of any desired construction, such as flanged members, rather than being internally threaded as illustrated in FIG. 1. A valve member in the form of a ball 20 having a port 22 therethrough is positioned in the valve chamber 18 for opening and closing the valve upon turning movement thereof in the usual fashion.

The ball 20 is turned by means of a stem 24 which will project out of the top (not shown) of the valve body 12. As shown in dashed lines in FIG. 1, the valve stem 24 is of rectangular cross-section to mate with a slot 26 in the top of the valve ball 20, such that the ball 20 will be turned upon turning of the valve stem 24, yet the ball 20 is free to move upstream and downstream when in a closed position with the port 22 turned at right angles to the inlet 14 and outlet 16. Thus, the valve ball 20 is of the type known in the art as a "floating" valve member or ball.

Each end of the valve chamber 18 is provided with concentric counterbores 28 and 30 forming cylindrical walls in alignment with the respective inlet or outlet of the valve. The counterbores 28 and 30 provide an annular shoulder 32 extending normal to the axis of the respective inlet or outlet and facing the interior of the valve chamber 18. Another annular shoulder 34 is formed between the smaller counterbore 28 and the respective inlet or outlet and the shoulder 34 also extends normal to the axis of the respective inlet or outlet and faces the interior of the valve chamber 18. The counterbores 28 and 30 are provided to receive and cooperate with upstream and downstream seat assemblies generally designated by reference characters 36 and 38, respectively. In a preferred form, the seat assemblies 36 and 38 are of the same construction, so it will be necessary only to describe one of such seat assemblies in detail.

A preferred seat assembly construction is illustrated in its relaxed condition in FIG. 2 and basically comprises an outer ring 40 and an inner ring 42. The outer ring 40 has a outer diameter of a size to provide a sliding fit thereof in the larger counterbore 30 at the respective end of the valve in which the assembly is to be used, and has what is sometimes herein called a valve-member end 44 shaped to mate with the outer surface of the respective valve member with which the seat assembly is to cooperate. In the present form of the invention, the surface 44 is curved on the arc of a circle corresponding to the curvature of the outer surface of the ball 20. The opposite or non-valve member end 46 of the outer ring 40 is shaped normal to the axis through the ring to abut the respective annular shoulder 32 in the end of the valve chamber 18, as will be set forth more fully below. Preferably, a chamfer 48 is formed between the end 46 and the outer periphery of the outer ring 40 to minimize the necessity for close machining between the ring 40 and the adjacent or mating surfaces of the valve body. A counterbore 50 is formed in the non-valve member end 46 of the ring 40 and provides an annular shoulder 52 extending normal to the axis of the ring 40 and facing away from the valve member with which the seat assembly is being used. The ring 40 is formed of a relatively inflexible material, such as metal or one of the fluorocarbon plastic materials, such as nylon or Teflon, to function as a bearing for supporting the valve member at the downstream end of the valve, as will be set forth more fully below.

In the form of seat assembly shown in FIG. 2, the inner ring 42 is also formed of a material having characteristics similar to the characteristics of the material of the outer ring 40, and a portion 54 of the valve-member end thereof is shaped to mate with the valve member with which the seat assembly is to be used. In other words, the portion 54 has a shape conforming to the shape of the end 44 of the outer ring 40. The valve-member end of the inner ring 42 is provided with a groove 56 extending from the portion 54 to the inner periphery of the ring, and an elastomer 58, such as natural or synthetic rubber is bonded in the groove 56. It will be observed that the groove 56 is of increasing depth as it approaches the portion 54 of the ring 42, and the exposed surface 60 of the elastomer 58 is formed on a slightly smaller radius than the portion 54 in order to progressively protrude beyond the surface 54 from the inner to the outer periphery of the portion 60, except that a relief groove 62 is formed in the surface 60 adjacent the portion 54 to prevent the elastomer 58 from being pinched off during opening and closing of the valve, as will be described more fully below. It should also be noted that the length of the elastomer 58, as measured from the inner to the outer periphery thereof, is substantially greater than the thickness thereof measured from the bottom of the groove 56 to the surface 60.

A pad 64 of an elastomeric material, such as natural or synthetic rubber, is molded on the outer or non-valve member end 66 of the inner ring 42 to act as a pusher pad against the respective shoulder 34 in the respective end of the valve body, as will be described further below. It will also be observed that an annular bead 68 is formed on the pad 64 adjacent the outer periphery of the pad. The diameter of the bead 68 is greater than the maximum diameter of the elastomer 58 on the opposite end of the ring 42 in order that the circumference of the seal provided by the pad 64 against the adjacent wall 34 of the valve body will be greater than the circumference of the seal provided between the elastomer 58 and the cooperating valve member, as will be set forth below. It will also be observed in FIG. 2 that a layer or film 70 of elastomer may be provided across the inner periphery of the ring 42, if desired.

The outer surface 72 of the inner ring 42 is sized to slidingly fit in the outer ring 40 for relative movement between the rings 40 and 42 during operation of the assembly. A circumferential flange 74 is formed on the outer or non-valve member end 78 of the flange counterbore 50 in the outer ring 40 to cooperate with the shoulder 52 and limit the movement of the ring 42 with respect to the ring 40 in one direciton. Another pad 76 of elastomeric material is bonded around the outer periphery of the flange 74 and protrudes beyond the outer or non-valve member end 78 of the flnage 74 to engage and seal against the respective annular wall 32 or the valve body as will be described.

Operation of embodiment of FIGS. 1 and 2

When the valve ball 20 is centered in the valve chamber 18, as when the valve is open as shown in FIG. 1, the pusher pads 64 on both of the seat assemblies 36 and 38 are placed under a state of partial compression, at least to the extent of having the beads 68 (FIG. 2) partially deformed. In fact, the seat assemblies 36 and 38 are sized such that the pusher pads 64 remain in contact with the annular walls 34 in all operating positions of the valve ball 20.

When the valve ball 20 is turned to a closed position by the stem 24, the ball is free to move downstream with respect to the stem 24, in the event a differential pressure is applied across the valve. Assuming that a pressure does exist at the inlet 14 of the valve, the ball 20 (see FIG. 4) will be moved downstream to engage the outer ring 40 of the downstream seat assembly 38 to in turn move this outer ring downstream. The outer ring 40 of the downstream seat assembly 38, and the ball 20, continue moving downstream until the non-valve member end 46 of the ring 40 engages the annular wall 32 in the valve body 12. The ball 20 will then be supported by the outer ring 40 of the downstream seat assembly. It will also be noted that the ball 20 moves the inner ring 42 of the downstream seat assembly downstream to further deform the respective pusher pad 64 between the ring 42 and the annular wall 34, as well as deform the elastomer 58. However, the flange 74 of the inner ring 42 will engage the annular wall 32 in the valve body to limit the deformation of the respective pusher pad 64, and the portion 54 of the inner ring will engage the ball 20 to limit the deformation of the elastomer 58, such that the elastic or resilient material will not be damaged. Finally, it should be noted that the elastomer or pad 76 will be forced into tight sealing engagement with the annular wall 32 to prevent the leakage of fluid around the outer ring 40 at the downstream end of the valve chamber.

When the ball 20 moves downstream, it will move away from the surface 44 of the outer ring 40 at the upstream end of the valve as shown in FIG. 3. However, the upstream pressure in the inlet end of the valve will gain access to the space between the outer end of the pusher pad 64 and the annular wall 34 to force the inner ring 42 downstream with the ball 20. In this connection it will be noted that the diameter of the seal bead 68 (which will remain in contact with wall 34) has a larger diameter than the maximum diameter of the elastomer 58 engaging the ball 20, such that the resultant force on the inner ring 42 provided by the upstream pressure will be in a direction forcing the ring 42 toward the ball 20. The portion 54 of the inner ring 42 at the upstream end of the valve will engage the ball 20 and limit the distortion of the elastomer 58 to prevent damage to the seal. At the upstream end of the valve, the outer ring 40 will be in what may be considered a neutral position when the valve is closed.

Figure 5:
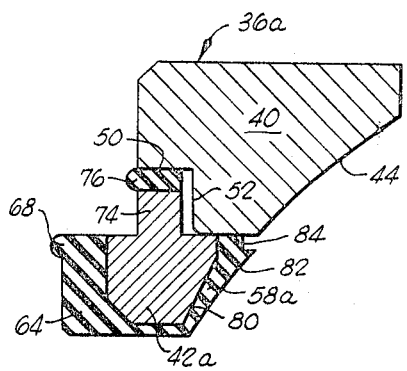
FIG. 5 is a view similar to FIG. 2 of a modified seat assembly.

Embodiment of FIG. 5

A slightly modified seat assembly 36a, which may be used at both the upstream and downstream ends of the valve 10, is shown in FIG. 5. This modified seat assembly utilizes the outer ring 40, as previously described, and a modified inner ring 42a. The inner ring 42a is of a metal or other relatively inflexible material, having the flange 74 and elastomer pad 76 thereon extending into the counterbore 50 in the outer ring 40, as well as having a pusher pad 64 bonded to the non-valve member end thereof and a seal bead 68 on the pusher pad 64. The valve-member end 80 of the inner ring 42a is simply tapered and has an elastomer 58a bonded thereto with the thickness of the elastomer 58a increasing toward the radially outer edge of the elastomer. The valve-member end or face 82 of the elastomer 58a has a radius of curvature less than the radius of curvature of the ball 20 and the surface 44 of the ouer ring 40, in the same manner as the surface 60 of the elastomer 58 previously described in connection with FIGS. 1 through 4. A relief groove 84 is provided at the radially outer edge of the elastomer 58a facing the interior of the valve in which the seat assembly is used to provide space for deformation of the elastomer 58a and prevent damage thereto during opening and closing of the valve.

The modified seat assembly 36a operates in substantially the same way as the seat assemblies 36 and 38 previously described. The only difference in the operation of this modified seat assembly is that the flange 74 of the inner ring 42a engages the shoulder 52 of the outer ring 40 to limit the downstream movement of the inner ring 42a when the seat assembly is used at the upstream end of the valve to limit the deformation of the elastomer 58a and prevent damage thereto.

Figure 6:
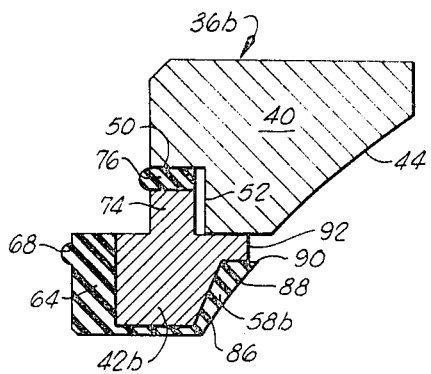
FIG. 6 is another view similar to FIG. 2 of another modified seat assembly.

Embodiment of FIG. 6

The modified seat assembly 36b shown in FIG. 6 is only a slight variation of the seat assembly 36a shown in FIG. 5. In the seat assembly 36b, the inner ring 42b has a groove 86 in the valve-member end thereof which increases in depth toward the outer periphery of the ring, much in the same manner as the groove 56 described and illustrated in connection with the embodiment of FIG. 2. An elastomer 58b is bonded in the groove 86 and the valve-member end or face 88 thereof is curved in the same manner as the face 82 of the elastomer 58a described in connection with FIG. 5. The outer edge 90 of the elastomer 58b terminates radially inward of the outer ring 40, such that a relief groove 92 is provided radially outward of the elastomer 58b, to receive a portion of the elastomer when the elastomer is deformed to prevent damage, much in the same manner as previously described for the relief groove 62 in FIG. 2 and the relief groove 84 in FIG. 5. Here again, the downstream movement of the inner ring 42b is limited by the flange 74 engaging the shoulder 52 in the outer ring 40 to limit deformation of the elastomer 58b and prevent damage thereto.

Figure 7:
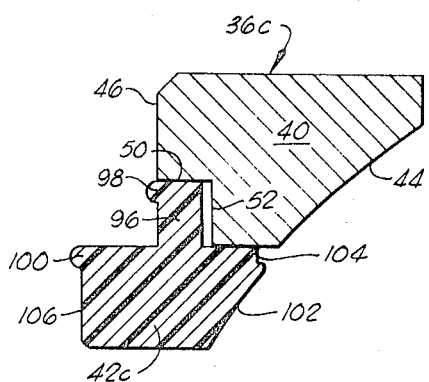
FIG. 7 is still another view similar to FIG. 2 of still another modified seat assembly.

Embodiment of FIG. 7

The modified seat assembly 36c illustrated in FIG. 7 again utilizes the outer ring 40 constructed in the same manner as previously described. The inner ring 42c is formed of one of the fluorocarbon plastics, such as nylon or Teflon, and is of a size to slidingly fit in the outer ring 40. A radial flange 96 is formed on the outer periphery of the ring 42c and extends into the counterbore 50 of the outer ring 40 to engage the shoulder 52 and limit the downstream movement of the ring 42c when the assembly is used in the upstream end of a valve. A bead 98 is formed on the end of the flange 96 facing away from the valve ball to engage a mating wall in the valve chamber in the same manner as the pad 76 in the embodiments previously described. An annular bead 100 is formed on the end of the ring 42c facing away from the valve ball to sealingly engage an annular wall in the valve chamber in the same manner as the bead 68 previously described. The valve-member end 102 of the inner ring 42c is curved with a radius of curvature less than the radius of curvature of the surface 44 of the outer ring 40 and the valve ball with which the assembly is used, except for the extreme radially outer portion 104 thereof which is formed normal to the axis of the ring to provide a relief space similar to the relief grooves previously described.

When the modified seat assembly 36c is used at the downstream end of a valve, the outer ring 40 will form a bearing for the valve ball in the same manner as previously described, and the inner ring 42c will be moved downstream to assure a seal between the outer bead 98 and the adjacent wall of the valve chamber. The thickness of the outer ring 40 between the ball bearing surface 44 and outer end 46 thereof is such that the valve ball will not unduly deform the inner ring 42c.

When the modified seat assembly 36c is used at the upstream end of a valve, the upstream pressure will act across the non-valve-member end 106 of the inner ring 42c between the bead 100 and the inner periphery of the ring to force the inner ring 42c tightly against the valve ball and provide an effective seal between the surface 102 of the inner ring and the valve ball. It will be observed that the diameter of the bead 100 is greater than the maximum diameter of the portion or surface 102 which engages the valve ball, such that the resulting force applied to the inner ring 42c by upstream pressure will be in a downstream direction to increase the seal provided by the ring 42c against the valve ball.

From the foregoing it will be apparent that the present invention provides a seat assembly which is particularly useful in a valve having a floating valve member, and the seat assembly will function as either an upstream or a downstream seal. The seat assembly will be effective in both high pressure and low pressure service conditions, since the elastic material used for sealing is fully protected by reinforcing material in all operating positions of the seat assemblies. The machining of the valve body is maintained at a minimum and both the seat assemblies and the valves in which the seat assemblies are used may be economically constructed and will have a long service life.

What is claimed is:
1. A valve, comprising:
   a body having an inlet opening, a valve chamber, and an outlet opening therein forming a flow passageway therethrough;
   a valve member supported in the valve chamber for opening and closing the flow passageway through the body; and
   a seat assembly in the valve chamber around one of said openings cooperating with the adjacent walls of the valve chamber and the valve member to close the flow passageway through the body, said seat assembly comprising:
       an outer ring of relatively inflexible material having one end face thereof shaped to mate with the valve member to form a bearing surface for the valve member, and having a counterbore in the non-valve-member end thereof providing an annular shoulder facing away from the valve member; and
       an inner ring slidingly fitting in the outer ring and having a circumferential flange thereon extending into said counterbore for engaging said annular shoulder on the outer ring and limiting the movement of the inner ring toward the valve member;
       said inner ring further having at least a portion of each end thereof formed of a material more flexible than the outer ring to sealingly engage the valve member and the valve body, respectively.
2. A valve as defined in claim 1 wherein the seat assembly is positioned around the inlet of the valve; and wherein said more flexible material is shaped to seal against the valve body around the inlet opening along a larger circumference than the circumference of the sealing engagement with the valve member, whereby the inner ring is urged against the valve member by upstream pressure.

3. A valve as defined in claim 1 wherein the seat assembly is positioned around the outlet of the valve, and wherein:

the inner ring includes a material around the outer periphery of said outer flange which is more flexible than the outer ring and positioned to engage and seal against the valve body around the outlet along a circumference greater than the circumference of the sealing engagement with the valve member.

4. A valve as defined in claim 1 wherein the inner ring is formed of a fluorocarbon plastic.

5. A valve, comprising:

a body having an inlet opening, a valve chamber, and an outlet opening therein forming a flow passageway therethrough, said valve chamber being shaped to provide annular wall means around the inlet and annular wall means around the outlet extending normal to the axis of the flow passageway;

a valve member supported in the valve chamber for opening and closing the flow passageway through the body and for movement along the flow passageway when in a closed position; and upstream and downstream seat assemblies in the valve chamber around the inlet and outlet openings, each seat assembly comprising:

an outer ring of relatively inflexible material having one end thereof engaging the respective annular wall means and having the opposite end thereof shaped to mate with the valve member, whereby the outer ring of the downstream seat assembly forms a bearing for the valve member when the valve member is closed, said outer ring having a counterbore in the end thereof facing said annular wall means providing an annular shoulder facing away from the valve member; and an inner ring slidingly supported in the outer ring having at least a portion of each end thereof formed of a material more flexible than the outer ring to sealingly engage the valve member and the respective annular wall means, respectively;

the distance between the outer ends of said inner rings, including said more flexible material, being greater than the distance between the adjacent portions of said annular wall at the opposite ends of the valve chamber when the inner rings engage the valve member, whereby said more flexible material is retained in a state of stress in all positions of the valve member;

said inner ring having a circumferential flange thereon extending into said counterbore for engaging the shoulder on the outer ring and limiting the downstream movement of the inner ring of the upstream seat assembly.

6. A valve as defined in claim 5 wherein each of said inner rings has a material more flexible than the outer ring around the outer periphery of said circumferential flange positioned to sealingly engage the respective annular wall means.

7. A valve as defined in claim 6 wherein said inner rings are formed of a fluorocarbon plastic.

8. A valve as defined in claim 5 wherein the more flexible material on the opposite ends of the upstream inner ring is shaped to sealingly engage the valve member along a smaller circumference than the respective annular wall means, whereby the upstream inner ring is urged toward the valve member by upstream pressure.

9. A valve as defined in claim 6 wherein said inner and outer rings are formed of metal, and said more flexible material is an elastomer bonded to the respected surfaces of the inner ring.

10. A valve as defined in claim 9 wherein the elastomer bonded to the end of each inner ring facing the respective annular wall means has a bead formed thereon having a larger diameter than the line of sealing engagement of the elastomer on the opposite end of the respective inner ring with the valve member.

11. A valve as defined in claim 9 wherein the end of each inner ring facing the valve member has a groove therein communicating with the inner periphery of the ring having a depth greater near the outer periphery of the ring, and said elastomer is bonded in said groove.

12. A valve, comprising:

a body having an inlet opening, a valve chamber and an outlet opening therein forming a flow passageway therethrough, said valve chamber being shaped to provide a pair of concentric cylindrical walls around each of said openings separated by an outer annular wall extending normal to the axis of the flow passageway, the inner of said cylindrical walls forming an inner annular wall immediately surrounding the respective opening;

a valve member supported in the valve chamber for opening and closing the flow passageway through the body and for movement along the flow passageway when in a closed position; and upstream and downstream seat assemblies in the valve chamber around the inlet and outlet openings, each of said seat assemblies, comprising:

an outer ring of relatively inflexible material telescoped into the space provided by the respective outer cylindrical wall with one end thereof in contact with the respective outer annular wall, the opposite end of said ring being shaped to mate with the valve member, whereby said ring in the downstream seat assembly provides a bearing for the valve member; said ring having a counterbore in said one end thereof forming an annular shoulder facing said outer annular wall; and an inner ring slidingly disposed in the outer ring and the space provided by the inner of said cylindrical walls, said inner ring having a circumferential flange on the outer periphery thereof extending into said counterbore to engage the annular shoulder on the outer ring and limit the movement of the inner ring toward the valve member;

said inner ring further having at least a portion of each end thereof formed of a material more flexible than the outer ring to sealingly engage the valve member and the inner annular wall, respectively, the distance between the outer ends of said inner rings, including said more flexible material, being greater than the distance between said inner annular walls, when the inner rings engage the valve member, whereby said more flexible material is retained in a state of stress at all times.

13. A valve as defined in claim 12 wherein each of said inner rings has a material more flexible than the outer ring located on the outer periphery of the circumferential flange thereof positioned to sealingly engage the respective outer annular wall.

14. A valve as defined in claim 12 wherein the more flexible material on the opposite ends of the upstream inner ring is shaped to sealingly engage the valve member along a smaller circumference than the respective inner annular wall, whereby the upstream inner ring is urged toward the valve member by upstream pressure.

15. A valve as defined in claim 13 wherein said inner and outer rings are formed of metal and said more flexible material is an elastomer bonded to the respective surfaces of the inner ring.

16. A valve as defined in claim 15 wherein the elastomer bonded to the end of each inner ring facing the respective inner annular wall has a bead formed thereon having a larger diameter than the line of sealing engagement of the elastomer on the opposite end of the respective inner ring with the valve member.

17. A valve as defined in claim 15 wherein the end of each inner ring facing the valve member has a groove therein communicating with the inner periphery of the inner ring having a depth greater near the outer periphery of the inner ring, and said elastomer is bonded in said groove.

18. A valve as defined in claim 17 wherein the radially outer edge of said groove is spaced radially inwardly of the outer periphery of the inner ring, and the elastomer bonded in said groove is relieved adjacent the outer radial edge of said groove.

19. A valve as defined in claim 17 wherein the radially outer edge of said groove is spaced radially inwardly of the outer periphery of the inner ring, and the end of the inner ring facing the valve member and positioned radially outwardly of said groove being shaped to mate with the valve member and limit the force applied to the elastomer in said groove in the seat assembly at the upstream end of the valve.

20. A valve as defined in claim 15 wherein the elastomer bonded on the valve-member end of the inner ring increases in thickness from the inner toward the outer periphery of the inner ring.

21. A valve as defined in claim 20 wherein the elastomer bonded on the end of the inner ring facing the valve member extends over the entire respective end of the inner ring and is relieved adjacent the outer ring.

22. A valve as defined in claim 12 wherein said valve member is spherically shaped.

23. A seat assembly for a valve having a floating valve member, comprising:
an outer ring of relatively inflexible material having one end thereof shaped to mate with the valve member and a counterbore in the opposite end thereof forming an annular shoulder facing away from the valve-member end of the ring; and
an annular ring slidingly supported in the outer ring and having a circumferential flange thereon extending into said counterbore to engage said annular shoulder and limit the sliding movement of the inner ring in the outer ring in one direction;
said inner ring having at least a portion of each end thereof formed of a material more flexible than the outer ring, the valve-member end of the inner ring being protruded beyond the valve member end of the outer ring when said flange engages said shoulder.

24. A seat assembly as defined in claim 23 wherein said inner ring is formed of a fluorocarbon plastic.

25. A seat assembly as defined in claim 23 wherein said inner and outer rings are formed of metal and said more flexible material is an elastomer bonded to the respective surfaces of the inner ring.

26. A seat assembly as defined in claim 25 wherein the elastomer bonded to the non-valve-member end of the inner ring has a bead formed thereon adjacent the outer periphery of the inner ring.

27. A valve as defined in claim 25 wherein the valve-member end of the inner ring has a groove therein communicating with the inner periphery of the inner ring and having a depth greater near the outer peirphery of the inner ring, and said elastomer is bonded in said groove.

28. A valve as defined in claim 25 characterized further to include a body of elastomeric material bonded around the outer periphery of said flange protruding beyond the non-valve-member end of the outer ring in all operating positions of the inner ring.

References Cited

UNITED STATES PATENTS

| | | | |
|---|---|---|---|
| 3,056,577 | 10/1962 | Kulisek | 251—317 XR |
| 3,132,837 | 5/1964 | Britton | 251—172 |
| 3,154,094 | 10/1964 | Bredtschneider | 251—315 XR |
| 3,380,708 | 4/1968 | Scaramucci | 251—172 |

HAROLD W. WEAKLEY, Primary Examiner

U.S. Cl. X.R.

251—192, 315, 317, 363

PO-1050
(5/69)

UNITED STATES PATENT OFFICE
CERTIFICATE OF CORRECTION

Patent No. 3,455,534            Dated July 15, 1969

Inventor(s) Domer Scaramucci

It is certified that error appears in the above-identified patent and that said Letters Patent are hereby corrected as shown below:

Column 4, line 2, delete "or non-valve member end 78 of the flange" and insert --periphery of the ring 42 and extends into the--;

Column 4, line 8, delete "flnage" and insert --flange--;

Column 10, line 1, delete "havng" and insert --having--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents